Aug. 28, 1928.

J. D. TUCKER ET AL 1,682,445

TREE SUPPORTING YOKE

Filed March 7, 1927    2 Sheets-Sheet 1

INVENTORS
J. D. Tucker and
F. C. Oldham
BY Perry S. Webster ATTORNEY

Aug. 28, 1928.                                                                       1,682,445
J. D. TUCKER ET AL
TREE SUPPORTING YOKE
Filed March 7, 1927                  2 Sheets-Sheet 2
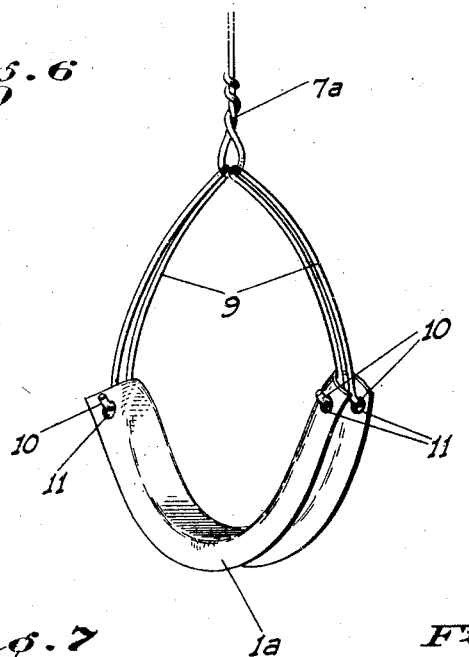
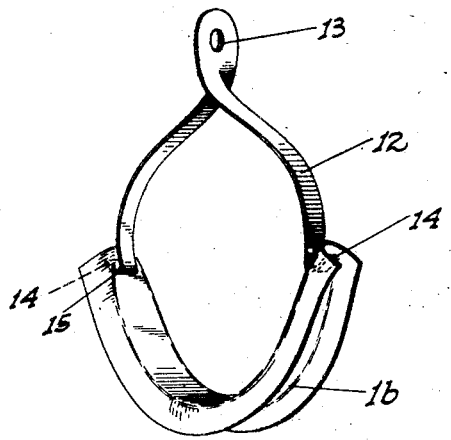
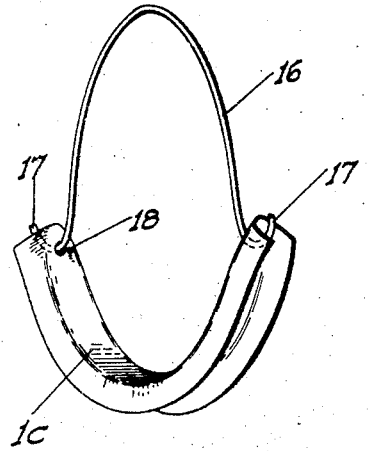
INVENTORS
J. D. Tucker and
F. C. Oldham
BY                    ATTORNEY Patented Aug. 28, 1928.

1,682,445

UNITED STATES PATENT OFFICE.

JESSE D. TUCKER, OF SACRAMENTO, AND FRED C. OLDHAM, OF YUBA CITY, CALIFORNIA; SAID JESSE D. TUCKER ASSIGNOR TO TUCKER BROTHERS MANUFACTURING COMPANY, A COPARTNERSHIP OF SACRAMENTO, CALIFORNIA.

TREE-SUPPORTING YOKE.

Application filed March 7, 1927. Serial No. 173,333.

This invention relates to the tree supporting art and is primarily directed as an improvement over that form of tree supporting yoke shown in our co-pending application for patent, filed September 21st, 1926, Serial No. 136,776.

The object of the present invention is to provide a tree yoke in the form of a sling which can be very rapidly associated with and disassociated from the supporting wires both for the purpose of initially wiring up the tree and for later shifting the supports in accordance with the growth of the tree or other conditions confronting the orchardists.

A further object of the invention is to produce a device which may be used for young and old trees alike without variation thereof, whereby when an orchardist equips himself with the slings he may use them indiscriminately either on young trees or older trees, or for shifting position as conditions may require.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claim.

In the drawings similar characters of reference indicate corresponding parts in the several views:

Figs. 6, 7 and 8 are perspective elevations of modified forms of the sling structure.

Referring now more particularly to the characters of reference on the drawings, the numeral 1 designates the yoke proper which is initially made from a flat rectangular piece of sheet metal struck up with a die into a substantially semi-circular channel shaped yoke as shown. This yoke has the free ends of the channel sides pinched together to form eyes 2 with open slots 3 to receive the supporting hangers. This type of yoke, with the exception of the hanger retaining eyes, is substantially the same construction as that shown in the co-pending application referred to in the preamble of this specification. Since the construction and advantages of this are therein described in full, we will therefore not go into details with respect thereto in this application.

Figure 3:
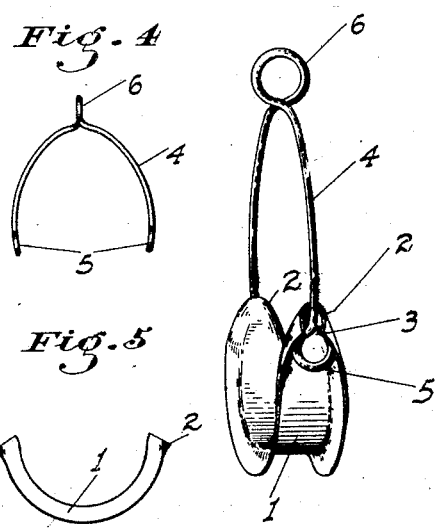
Fig. 3 is a perspective view of the complete sling.
Figure 5:
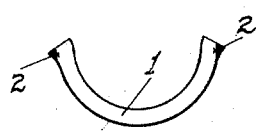
Fig. 5 is a side elevation of the yoke per se.

In connection with the device as at presently constructed we do not intend to pass the supporting wires directly around the channel of the yoke but provide hangers which may be quickly and easily associated or disassociated from the yoke. The hanger comprises a resilient wire member 4 of wishbone shape provided at its free ends with enlarged heads, eyes or the like 5 adapted to fit into the channel of the yoke 1 and engage the pinched-in eyes 2 thereof so that when the hanger and the yoke are associated together a very substantial supporting sling is formed, as shown graphically in Fig. 3.

The outer end of the wishbone shaped hanger 4 is bent to form an eye 6, the axis of this eye extending substantially at right angles to the axis of the yoke 1 for a purpose as will presently appear.

Figure 1:
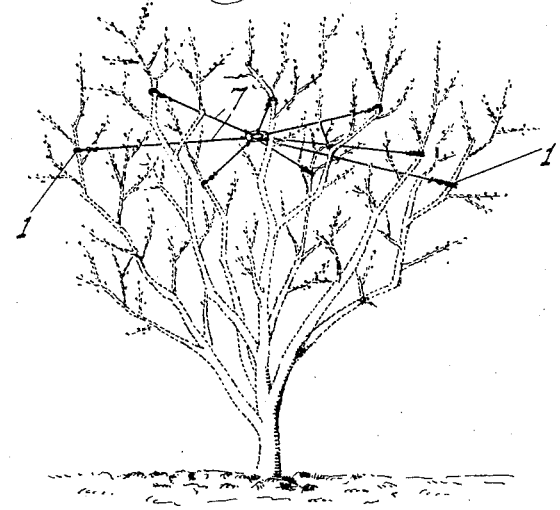
Fig. 1 is a side elevation of a tree showing the application of our improved supporting sling mechanism thereto, the tree being depicted as a full grown tree.

In practice, as will be obvious, the yokes may be very readily positioned around the tree limbs as shown in Fig. 1, and the spring hangers readily connected therewith merely by spreading the sides of the wishbone apart under the spring tension thereof and moving the same through the slots 3 until the locking heads 5 engage the pinched-in eyes 2 which will hold the yoke firmly engaged by the hanger. The supporting wires 7 may be either initially connected with the eyes 6 or may be wired into position thereon as the supporting work is proceeded with.

It will be obvious that with a structure of the type described the slings may be readily shifted from position to position or interchanged, or the wires lengthened or shortened at will in a very easy and rapid manner. This will reduce the cost of labor for the installing of the supports and at the same time will permit a much better and flexible operation being carried on.

Figure 2:
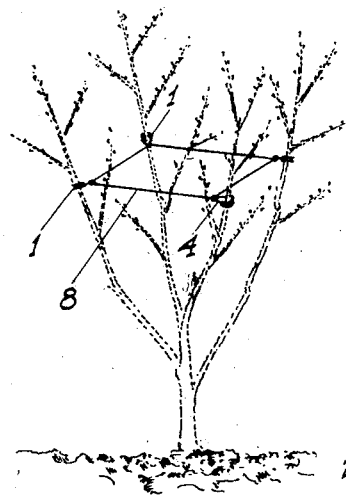
Fig. 2 is a similar view showing how the slings may be applied for use in supporting a young tree.
Figure 4:
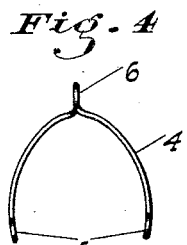
Fig. 4 is a plan view of the fastening hanger detached from the yoke proper.

It is the custom in supporting young trees of about the shape shown in Fig. 2 to merely tie a rope around the young limbs to hold them together, which rope is discarded as the tree grows. This is quite an expensive method but has been used for the reason that it provides a very quick means of supporting the tree, and labor cost is always an extremely important item. By the use of our improved supporting sling structure, however, with the axes of the eyes 6 set at right angles to the axes of the yokes 1 this permits a single wire or rope 8 to be strung through the eyes 6 to support the limbs of the young tree, and this single wire may be put through these eyes just as quickly as a rope could be tied around the tree, and as the limbs grow the supporting slings may be shifted upwardly very easily with or without changing the wire 8, and even if a change should become necessary it could be made, as stated, in a very rapid and inexpensive manner.

In the type of structure shown in Fig. 6, the hanger is made of two separate wire loop members 9, which are substantially pivoted onto the ends of the yoke 1ª by bending the ends of the wires laterally as at 10 and projecting them through holes 11 in the channel sides of the yoke adjacent the ends thereof.

When applying this type of sling to the tree it is not necessary to remove the hanger-wires, since these may be swung away from the yoke to clear the limb engaged by the yoke, and then brought back until their free loop-ends are adjacent each other. The supporting wire 7ª may then be rove through the loop ends, as shown.

In the form of sling shown in Fig. 7, the hanger 12 is cut from a single piece of sheet metal, bent to shape so that a wishbone shaped member is formed substantially the same as the hanger 4, and having a wire receiving eye 13 disposed in the same position relative to the axis of the yoke 1ᵇ as the eye 6 of the hanger 4. In this type, the legs of the hanger tend to spring apart, and at their free ends are formed with outwardly bent hooks 14 adapted to be detachably projected through transverse slots 15 in the yoke, from the concave or inner face thereof.

The sling shown in Fig. 8 utilizes a single wishbone-shaped hanger 16 of wire, without an eye. The legs of this hanger also tend to spread apart, and at their free ends are bent outwardly to form hooks 17 arranged to be detachably projected through holes 18 in the yoke 1ᶜ, from the inner or concave face thereof.

It will be readily apparent to those skilled in the art that our two piece supporting sling structure has many advantages over the single piece yoke heretofore used in various forms, and of which that type shown in our co-pending application for patent is a fair example; that its use will be much more flexible and the labor cost of supporting a tree with our slings will be much less than when the single piece yokes are used, and a generally better supporting operation can be carried out. Furthermore the same slings may be used over and over and moved along the branches of the trees progressively with the growth of the tree, or under such other conditions as may arise.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described our invention what we claim as new and useful and desire to secure by Letters Patent is:

A tree supporting element including a two piece sling, one piece being a semi-circular channel shaped yoke, the sides of the channel being pinched together at their ends to form eyes each having a slot in the side periphery thereof, the other piece of the sling comprising a substantially U-shaped resilient member having locking heads on its free ends whereby the sides of the U-shaped member may be sprung into the eyes and the heads will prevent disassociation of the parts with a longitudinal pull on the sling.

In testimony whereof we affix our signatures.

JESSE D. TUCKER.
FRED C. OLDHAM.